United States Patent
Okabe et al.

(10) Patent No.: US 10,079,394 B2
(45) Date of Patent: Sep. 18, 2018

(54) METHOD OF WELDING POROUS BODY FLOW PATH

(71) Applicants: TOYOTA JIDOSHA KABUSHIKI KAISHA, Toyota-shi, Aichi-ken (JP); TOYOTA SHATAI KABUSHIKI KAISHA, Kariya-shi, Aichi-ken (JP)

(72) Inventors: Hiroki Okabe, Okazaki (JP); Makoto Aoyama, Obu (JP); Hiroshi Adachi, Okazaki (JP); Takashi Kondo, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/870,339

(22) Filed: Sep. 30, 2015

(65) Prior Publication Data
US 2016/0104902 A1 Apr. 14, 2016

(30) Foreign Application Priority Data

Oct. 14, 2014 (JP) .................................. 2014-209810

(51) Int. Cl.
| | |
|---|---|
| *B23K 11/10* | (2006.01) |
| *H01M 8/0286* | (2016.01) |
| *B23K 11/11* | (2006.01) |
| *B23K 11/00* | (2006.01) |
| *B23K 11/31* | (2006.01) |
| *H01M 8/0232* | (2016.01) |
| *B23K 101/18* | (2006.01) |

(Continued)

(52) U.S. Cl.
CPC .......... *H01M 8/0286* (2013.01); *B23K 11/004* (2013.01); *B23K 11/115* (2013.01); *B23K 11/31* (2013.01); *H01M 8/0232* (2013.01); *B23K 2201/18* (2013.01); *B23K 2201/36* (2013.01); *B23K 2203/05* (2015.10); *H01M 2008/1095* (2013.01); *Y02P 70/56* (2015.11)

(58) Field of Classification Search
CPC ............ B23K 2201/18; B23K 2201/36; B23K 11/004; B23K 11/115; B23K 11/31; H01M 8/0232; H01M 8/0286; H01M 2008/1095
See application file for complete search history.

(56) References Cited

U.S. PATENT DOCUMENTS

2013/0260281 A1* 10/2013 Sato ...................... H01M 8/006
429/482
2016/0093902 A1 3/2016 Kondou

FOREIGN PATENT DOCUMENTS

| CN | 103250290 A | 8/2013 |
|---|---|---|
| DE | 10 2007 007 392 A1 | 8/2007 |

(Continued)

*Primary Examiner* — Dana Ross
*Assistant Examiner* — Brandon Harvey
(74) *Attorney, Agent, or Firm* — Finnegan, Henderson, Farabow, Garrett & Dunner, LLP

(57) ABSTRACT

A method of welding comprising contacting a first electrode to a porous body flow path, contacting a second electrode to a plate material, pressing the porous body flow path and the plate material by the first and second electrodes in a thickness direction of the plate material, and spot welding the porous body flow path and the plate material, wherein: a deformation of the plate material in a direction of the second electrode pressing the plate material is smaller than a deformation of the porous body flow path in a direction of the first electrode pressing the porous body flow path.

6 Claims, 16 Drawing Sheets

(51) Int. Cl.
 *B23K 101/36* (2006.01)
 *B23K 103/04* (2006.01)
 *H01M 8/1018* (2016.01)

(56) References Cited

FOREIGN PATENT DOCUMENTS

| | | | | |
|---|---|---|---|---|
| EP | 1 826 850 A2 | 8/2007 | | |
| EP | 1826850 A2 * | 8/2007 | ........... | B23K 11/087 |
| JP | S62-137183 A | 6/1987 | | |
| JP | 2012-123949 | 6/2012 | | |
| WO | WO 2006103367 A2 * | 10/2006 | ............. | B23K 20/06 |

* cited by examiner

FEEDING DIRECTION

METHOD OF WELDING POROUS BODY FLOW PATH

CROSS-REFERENCE TO RELATED APPLICATION

This application claims priority based on Japanese Patent Application No. 2014-209810, filed on Oct. 14, 2014, the contents of all of which are incorporated herein by reference in their entirety.

BACKGROUND

Field

The present invention relates to a porous body flow path.

Related Art

It is known that a structure in which a shield plate is disposed inside a fuel cell in a pinched manner. JP2012-123949A discloses a fuel cell in which the shield plate is disposed between a seal material and a porous body flow path near a manifold. The purpose of providing the shield plate is to shield the seal material from flowing and entering into the porous body flow path.

JP2012-123949A does not fully discuss the method of mounting the shield plate to the fuel cell. The present invention is made in view of the conventional technology described above, and the purpose of the invention is to provide a suitable joining method when a technique of joining a porous body flow path and a shield plate is adopted.

SUMMARY

The invention can be implemented in the following forms.

According to one aspect of the present invention, a method of welding is provided, which includes contacting a first electrode to a porous body flow path, contacting a second electrode to a plate material, pressing the porous body flow path and the plate material by the first and second electrodes in a thickness direction of the plate material, and spot welding the porous body flow path and the plate material. A deformation of the plate material in a direction of the second electrode pressing the plate material is smaller than a deformation of the porous body flow path in a direction of the first electrode pressing the porous body flow path. According to this aspect, a variation in thickness of the members formed by the welding is reduced. The variation can be reduced because the deformation is reduced as described above to reduce the deformation of the plate material. The porous body flow path is difficult to give influences of a deformation of the spot welding to other parts because of the structure thereof. Therefore, even if the porous body flow path is deformed, it is difficult to cause the variation described above, compared with the deformation of the plate material.

In the aspect described above, an area of an end face of the first electrode may be smaller than an area of an end face of the second electrode. According to this aspect, the aspect described above can easily be achieved.

In the aspect described above, the porous body flow path may be joined by the spot welding at a part thereof that surface-contacts the plate material in a state before the spot welding is performed. According to this aspect, since welding current is stabilized, the welding can suitably be performed.

In the aspect described above, the spot welding may be initiated after the first electrode surface-contacts the porous body flow path. According to this aspect, deterioration of the end face of the first electrode due to repeating the spot welding can be reduced.

In the aspect described above, the plate material may be a shield plate that shields a seal material when the plate material is assembled as a fuel cell. According to this aspect, the porous body flow path and the shield plate can be joined.

The present invention can be achieved in various forms other than the forms described above. For example, the present invention can be achieved in a form, such as a method of manufacturing a fuel cell including a method of welding the porous body flow path.

DESCRIPTION OF THE EMBODIMENTS

Figure 1:
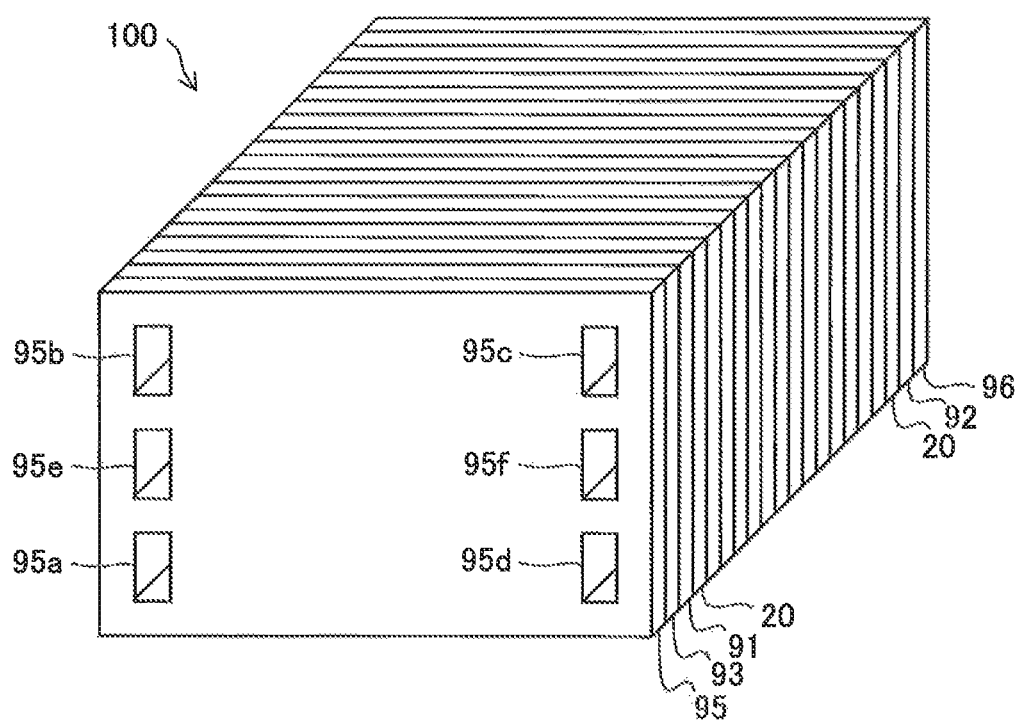
FIG. 1 is an external view of a fuel cell.

FIG. 1 schematically illustrates an appearance of a fuel cell 100. The fuel cell 100 is a fuel cell for automobiles. The fuel cell 100 includes a plurality of power generation units 20, terminal plates 91 and 92, an insulating plate 93, and end plates 95 and 96. The terminal plates 91 and 92 are disposed on both sides of the power generation units 20 which are laminated, and are used in order to retrieve electric power from the power generation units 20. The insulating plate 93 is disposed outside the terminal plate 91. The end plates 95 and 96 are disposed on both sides of the fuel cell 100 in order to fasten the power generation unit 20, the terminal plates 91 and 92, and the insulating plate 93 to each other.

The power generation units 20, the terminal plate 91, the insulating plate 93, and the end plate 95 have a plurality of (e.g., six) openings, respectively, and these openings are connected together to form six manifolds. Specifically, a hydrogen supply manifold 95a, an air supply manifold 95b, a hydrogen discharge manifold 95c, an air discharge manifold 95d, a cooling water supply manifold 95e, and a cooling water discharge manifold 95f are formed.

Figure 2:
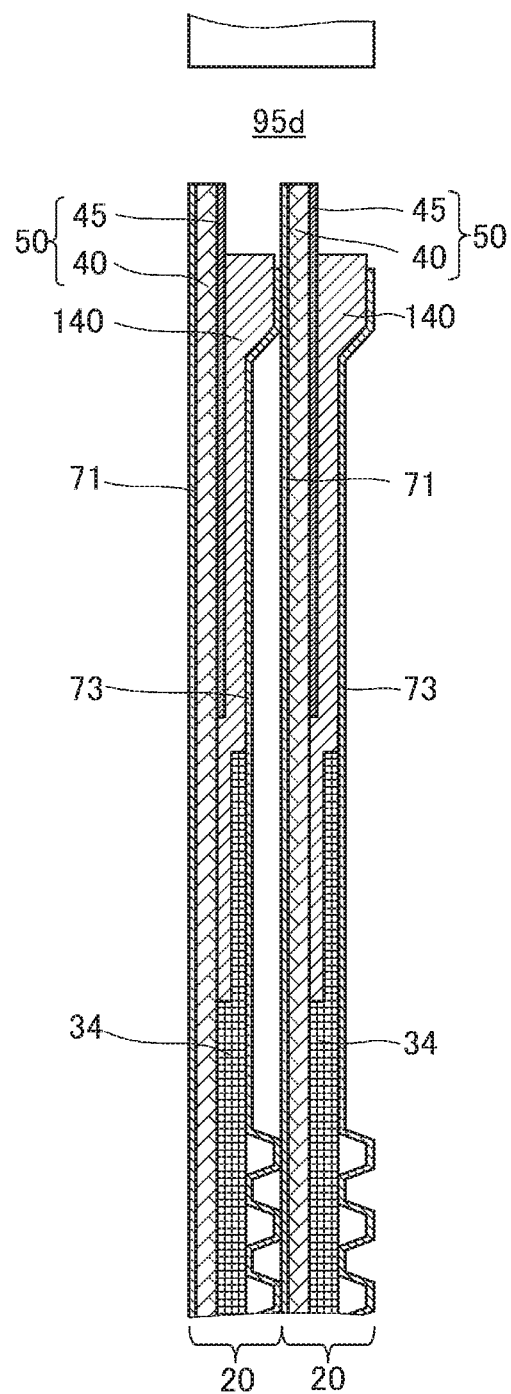
FIG. 2 is a cross-sectional view illustrating part near an air discharge manifold.

FIG. 2 is a cross-sectional view illustrating part near the air discharge manifold 95d. As illustrated in FIG. 2, each power generation unit 20 includes a membrane electrode gas diffusion layer assembly 34, a porous body flow path 40, a shield plate 45, a cathode-side separator 71, an anode-side separator 73, and a seal material 140.

The membrane electrode gas diffusion layer assembly 34 is an assembly of a cathode diffusion layer, a membrane electrode assembly, and an anode diffusion layer. The membrane electrode assembly is an assembly of a cathode electrode, an electrolyte membrane, and an anode electrode.

The porous body flow path 40 forms a flow path through which fluid supplied from the cooling water supply manifold 95e flows. The porous body flow path 40 is comprised of an expanded metal. The seal material 140 and the shield plate 45 are disposed between the porous body flow path 40 and the anode-side separator 73. The seal material 140 is comprised of adhesives, thermoplastic resin, rubber, etc. The seal material 140, together with the cathode-side separator 71 and the anode-side separator 73, seal for a leak of air, hydrogen gas, and cooling water.

The shield plate 45 is made of stainless steel etc., and is disposed between the porous body flow path 40 and the seal material 140. The shield plate 45 is joined to the porous body flow path 40. This assembly is hereinafter referred to as a "flow path member 50." When the seal material 140 flows, the shield plate 45 shields the flowing seal material 140 to prevent the seal material 140 from entering into the porous body flow path 40.

Figure 3:
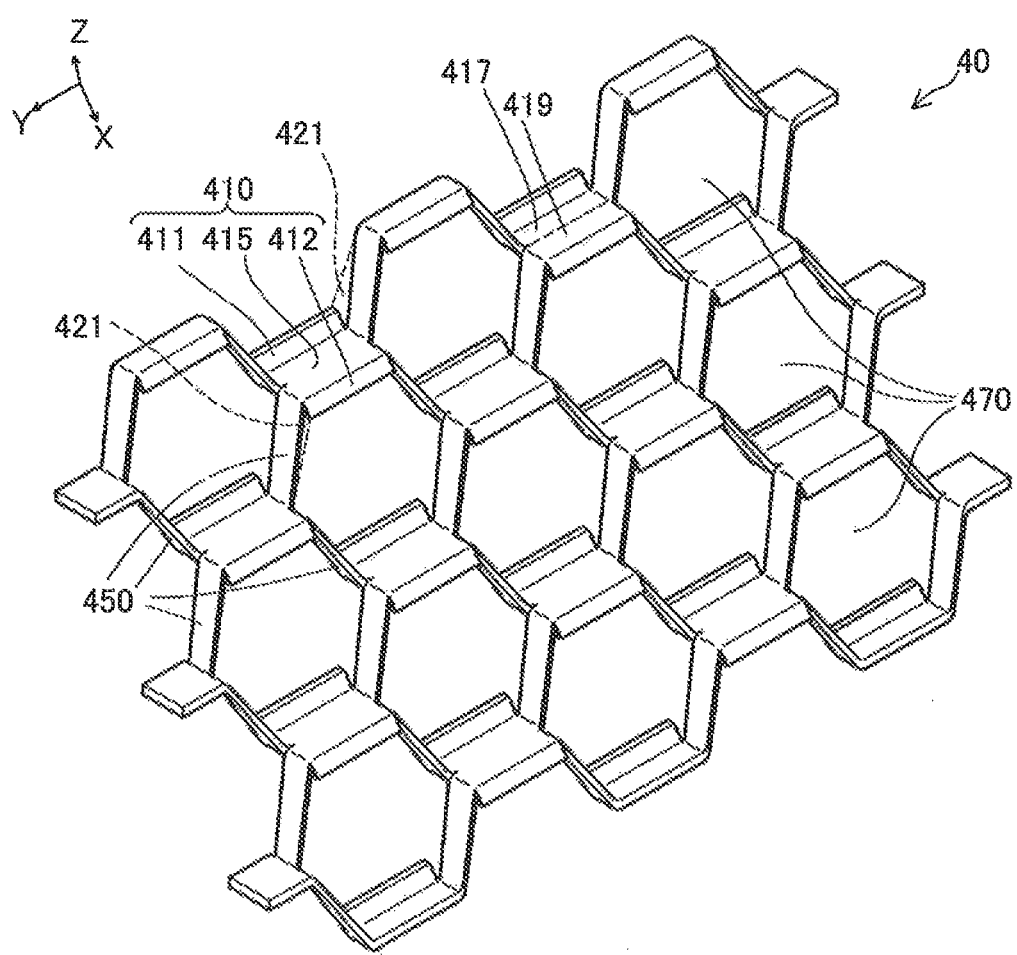
FIG. 3 is a perspective view illustrating a porous body flow path.

FIG. 3 is a perspective view illustrating the porous body flow path 40. The porous body flow path 40 has a structure in which a base part 410 and a connecting part 450 are repeatedly connected. Each base part 410 includes a first inclined portion 411, a second inclined portion 412, and a flat portion 415.

The flat portion 415 is a flat plate part, and is virtually divided into a valley portion 417 and a mountain portion 419. The connecting part 450 connects the valley portion 417 belonging to a certain base part 410 with the mountain portion 419 belonging to another base part 410. A space surrounded by two base parts 410 and four connecting parts 450 forms a mesh 470. Each mesh 470 functions as a flow path in a state where the porous body flow path 40 is assembled as part of the fuel cell 100.

The first inclined portion 411 is connected with the valley portion 417 and inclines with respect to the flat portion 415. The second inclined portion 412 is connected with the mountain portion 419 and inclines with respect to the flat portion 415.

A gap 421 is formed between the first inclined portion 411 and the connecting part 450. The gap 421 is also formed between the second inclined portion 412 and the connecting part 450. Each gap 421 functions as a flow path, similar to the mesh 470, in the state where the porous body flow path 40 is assembled as part of the fuel cell 100.

As illustrated in FIG. 3, X-axis, Y-axis, and Z-axis are defined for the porous body flow path 40. XY plane is a plane formed by each flat portion 415. Y-direction is a direction parallel to a borderline between the first inclined portion 411 and the flat portion 415. Y-direction is also a direction parallel to a borderline between the second inclined portion 412 and the flat portion 415. X-direction is a direction perpendicular to Y-direction. Z-direction is a direction perpendicular to the XY plane.

Figure 4:
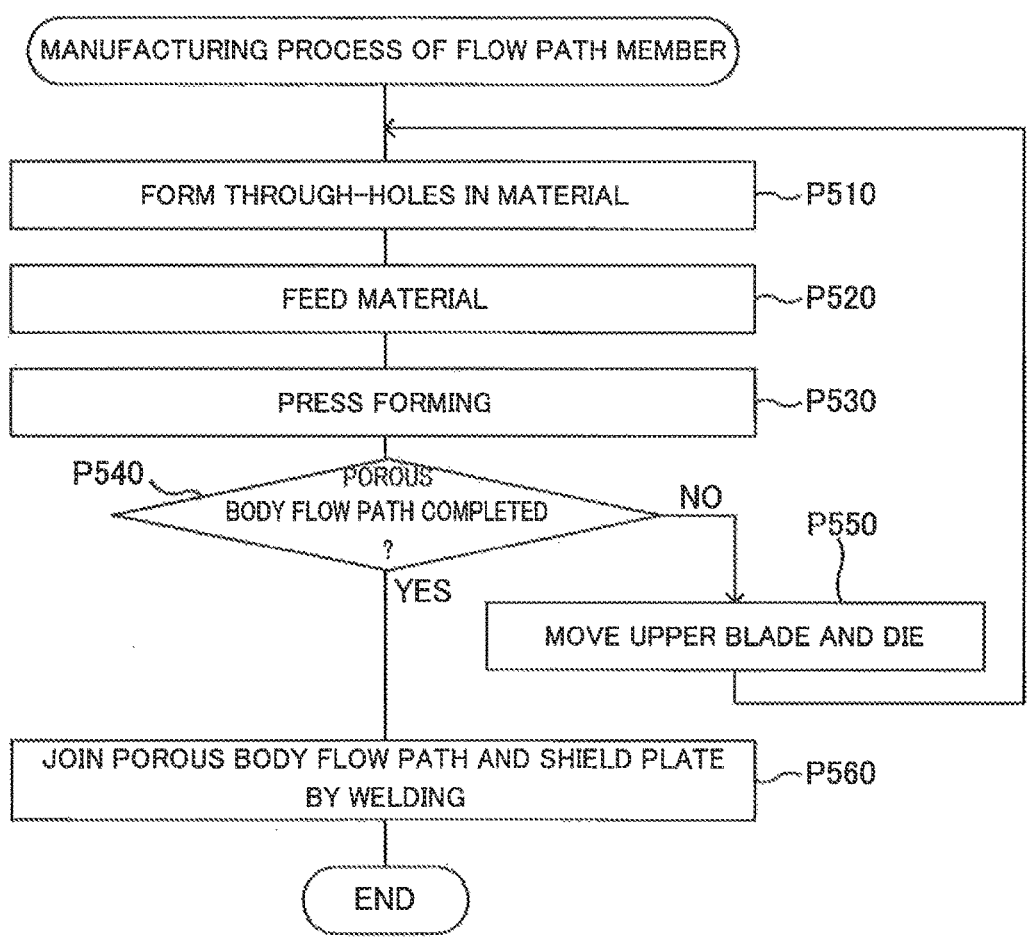
FIG. 4 is a view illustrating an outline of a manufacturing process of a flow path member.

FIG. 4 illustrates an outline of a manufacturing process of the flow path member 50. First, the porous body flow path 40 is manufactured by lathing at processes P510 to P550. The manufacturing process of the porous body flow path 40 includes, first, as illustrated in FIG. 5, forming a row of through-holes 421a in a raw material 210 in width directions of the raw material 210 (process P510), and then feeding the raw material 210 in the X-direction by rollers 340 (process P520).

Figure 5:
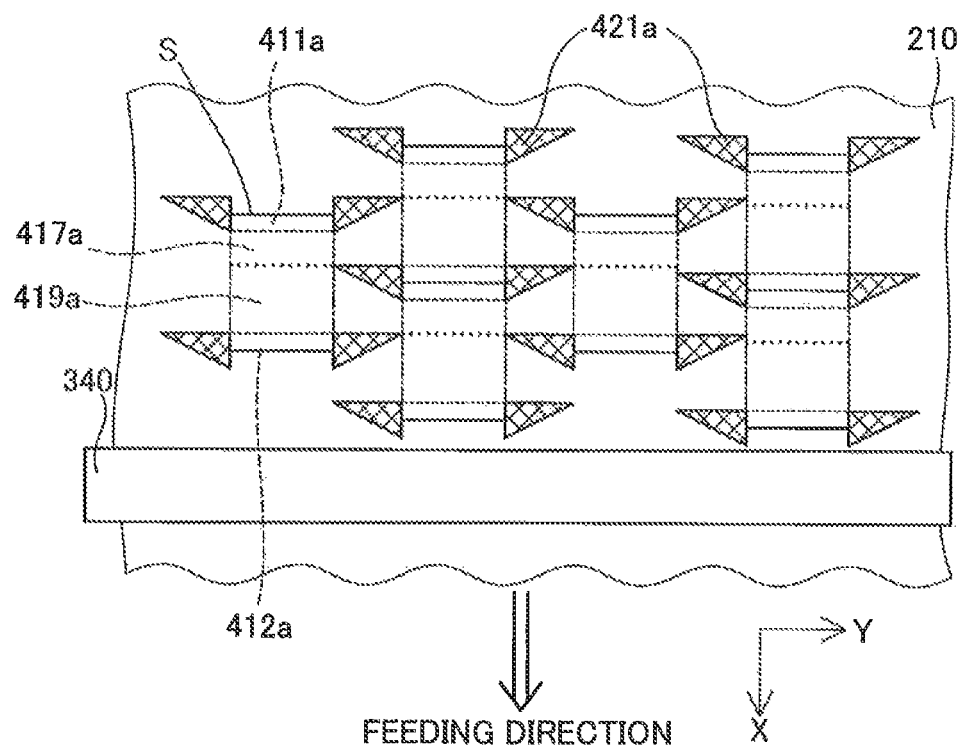
FIG. 5 is a view illustrating a state in which through-holes are formed in a material.
Figure 6:
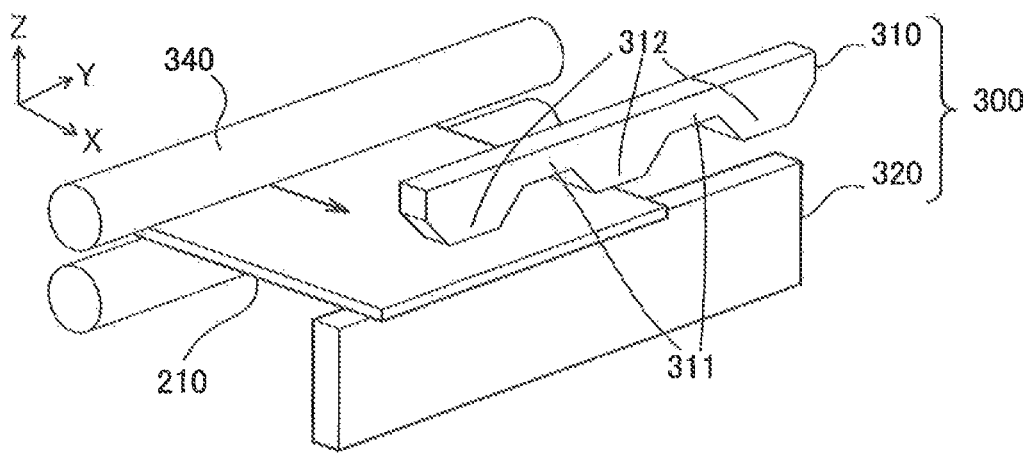
FIGS. 6 to 10 are views illustrating a manufacturing process of the porous body flow path.

FIG. 5 illustrates a state in which the through-holes 421a are formed in the raw material 210. The raw material 210 is a plate made of stainless steel etc. The through-holes 421a are formed by punching with a press machine. Each row of through-holes 421a are sequentially formed using a conveyance of the raw material 210 by the rollers 340 (process P520). Each through-hole 421a is a part which becomes the gap 421 by press forming described later.

Hereinafter, the manufacturing process is described using FIGS. 6 to 11. FIGS. 6 to 11 are perspective views illustrating a cutter 300. The cutter 300 includes an upper blade 310, a lower blade 320, and a die 330. Note that illustration of the die 330 is omitted in FIGS. 6 to 11 in order to simplify illustration of the cutter 300. The die 330 is to form the first inclined portion 411 and the second inclined portion 412, and this forming process will be described together with FIGS. 12 and 13. Further, in FIGS. 6 to 11, illustration of the through-holes 421a is omitted in order to simplify illustration of a half product of the porous body flow path 40.

Figure 7:
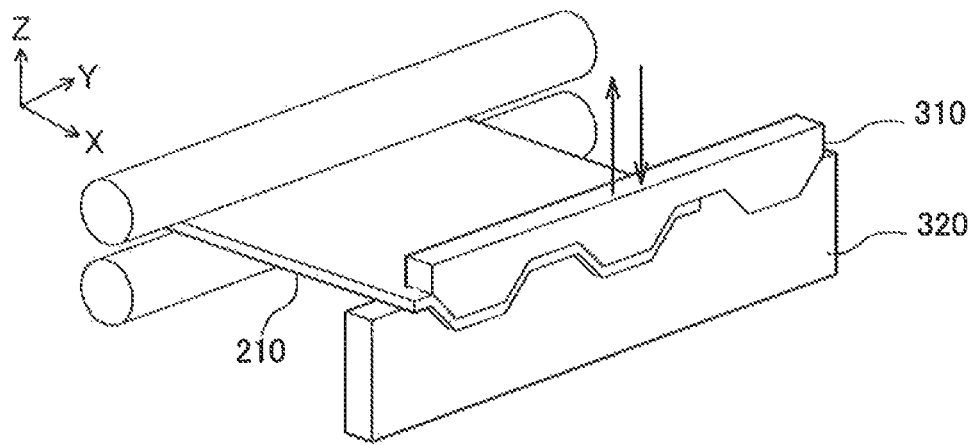

After process P520, a press forming is carried out as illustrated in FIG. 7 (process P530). Specifically, the upper blade 310 is lowered until a bottom face of a protruded portion 312 of the upper blade 310 crosses with a top face of the lower blade 320 to partially cut the raw material 210. Among the cut portions, portions which moved downwardly in the Z-direction form the valley portions 417, and portions which were plastically deformed form the connecting parts 450. The mountain portions 419 are defined by forming the connecting parts 450.

The protruded portions 312 contact valley portion formation scheduled areas 417a and first inclined portion scheduled area 411a which are illustrated in FIG. 5, and cut the raw material 210 in cutting planes S. Second inclined portion scheduled areas 412a illustrated in FIG. 5 are parts which become the second inclined portions 412 by the press forming described above. Mountain portion scheduled areas 419a illustrated in FIG. 5 are parts which become the mountain portions 419 by the press forming described above.

Figure 8:
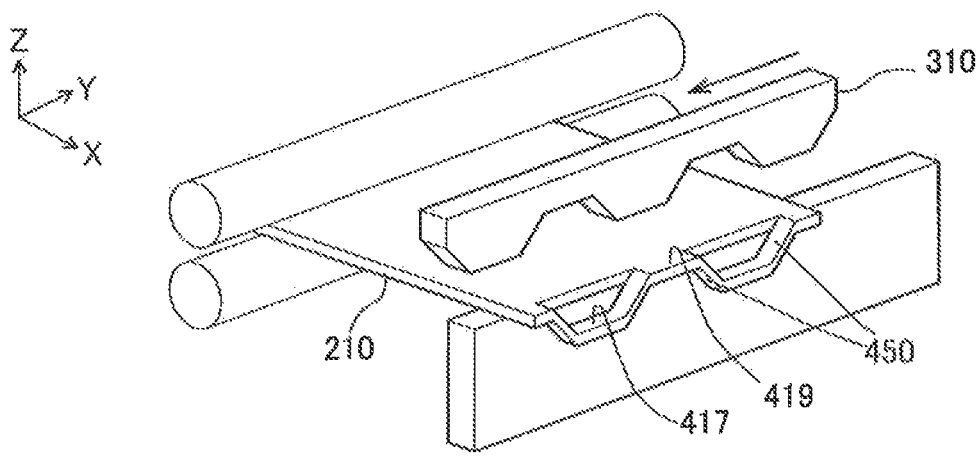

If the manufacturing process of one sheet of the porous body flow path 40 has not been completed (process P540, NO), the upper blade 310 and the die 330 (described later with FIGS. 12 and 13) are moved in an arrow direction in the Y-directions by a predetermined amount as illustrated in FIG. 8 (process P550). Then, the processes P510 to P540 are performed again.

Figure 9:
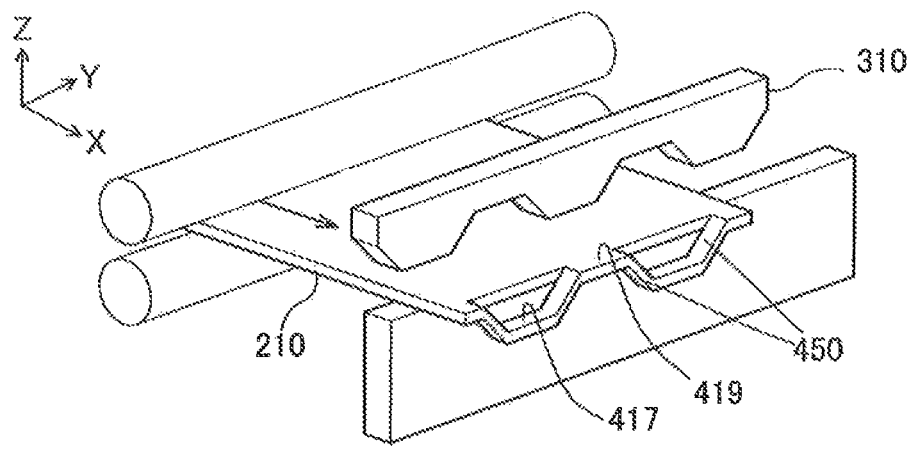
Figure 10:
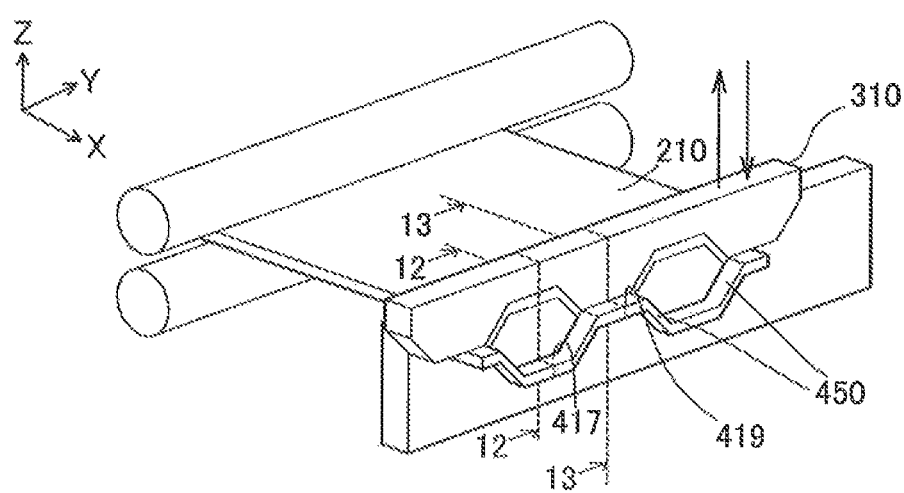
Figure 11:
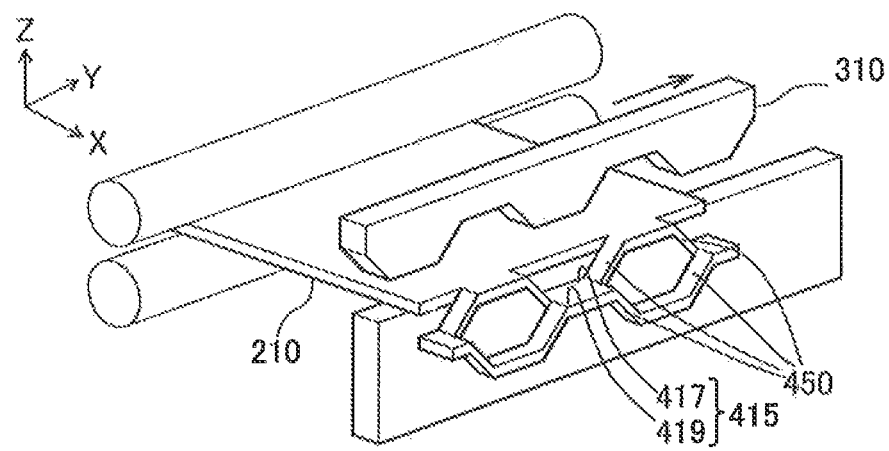
FIG. 11 is a perspective view illustrating a cutter for forming a valley portion.

FIG. 9 illustrates a state in which the process P520 is performed again. FIG. 10 illustrates a state in which the process P530 is performed again. FIG. 11 illustrates a state in which the process P550 is performed again. The valley portion 417 formed by the process P530 for the second time forms the flat portion 415 together with the mountain portion 419 formed by last process P530.

Figure 12:
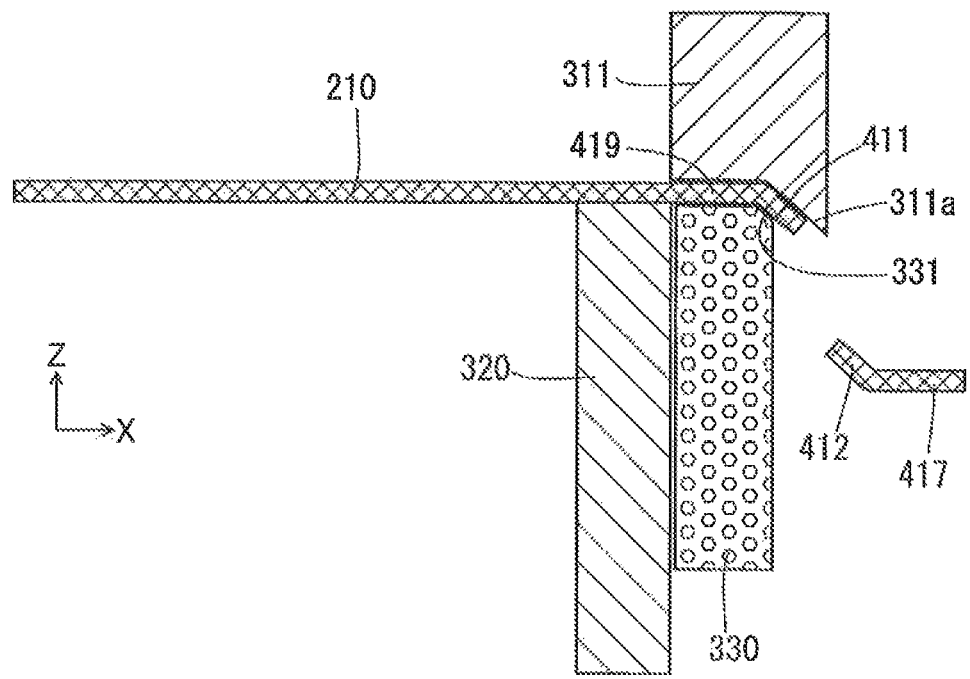
FIG. 12 is a cross-sectional end view taken along a line 12-12 in FIG. 10.

FIG. 12 is a cross-sectional end view taken along a line 12-12 in FIG. 10, for illustrating formation of the first inclined portion 411. A recessed portion 311 belonging to the upper blade 310 includes a first upper slope 311a as illustrated in FIG. 12 (not illustrated in FIGS. 6 to 11). The die 330 belonging to the cutter 300 includes a first lower slope 331. The first lower slope 331 is disposed opposing to the first upper slope 311a.

At process P530, the die 330 is brought in contact with the raw material 210 before the upper blade 310 is lowered. When the upper blade 310 is lowered, part of the materials 210, which is part pinched between the first upper slope 311a and the first lower slope 331, is bent. This curved portion serves as the first inclined portion 411.

Figure 13:
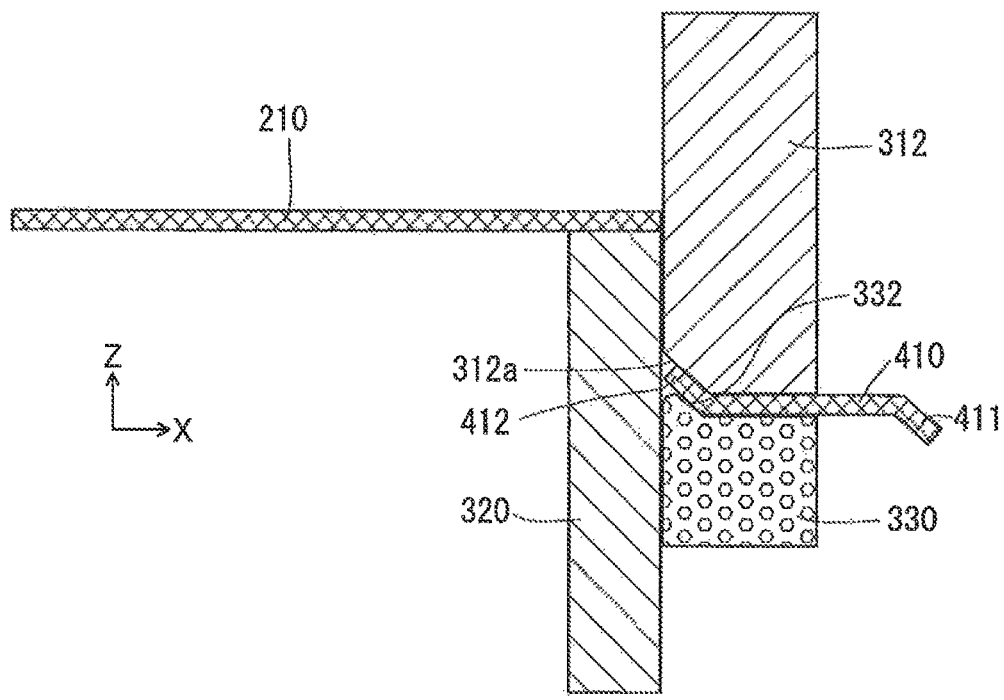
FIG. 13 is a cross-sectional end view taken along a line 13-13 in FIG. 10.

FIG. 13 is a cross-sectional end view taken along a line 13-13 in FIG. 10 for illustrating formation of the second inclined portion 412. As illustrated in FIG. 13, the protruded portion 312 of the upper blade 310 includes a second upper slope 312a. The die 330 includes a second lower slope 332. The second lower slope 332 is disposed opposing to the second upper slope 312a.

Since the protruded portion 312 is provided with the second upper slope 312a, cutting does not occur when the protruded portion 312 begins to contact the raw material 210 but bending occurs along the second upper slope 312a. When the upper blade 310 is further lowered, cutting occurs so that the valley portion 417 and the second inclined portion 412 are formed. Note that, at this time, the formation of the valley portion 417 and the second inclined portion 412 has not been completed. When the upper blade 310 is further lowered until it reaches a stop position, the valley portion 417 contacts the die 330 and is pinched between the protruded portion 312 and the die 330. As the result, the valley portion 417 and the second inclined portion 412 are formed.

After the processes P510 to P550 described above are repeated for a predetermined number of times, the manufacturing process of one sheet of the porous body flow path 40 is completed (process P540, YES). Then, the flow path member 50 is manufactured by welding the porous body flow path 40 to the shield plate 45 (process P560), as described later.

Figure 14:
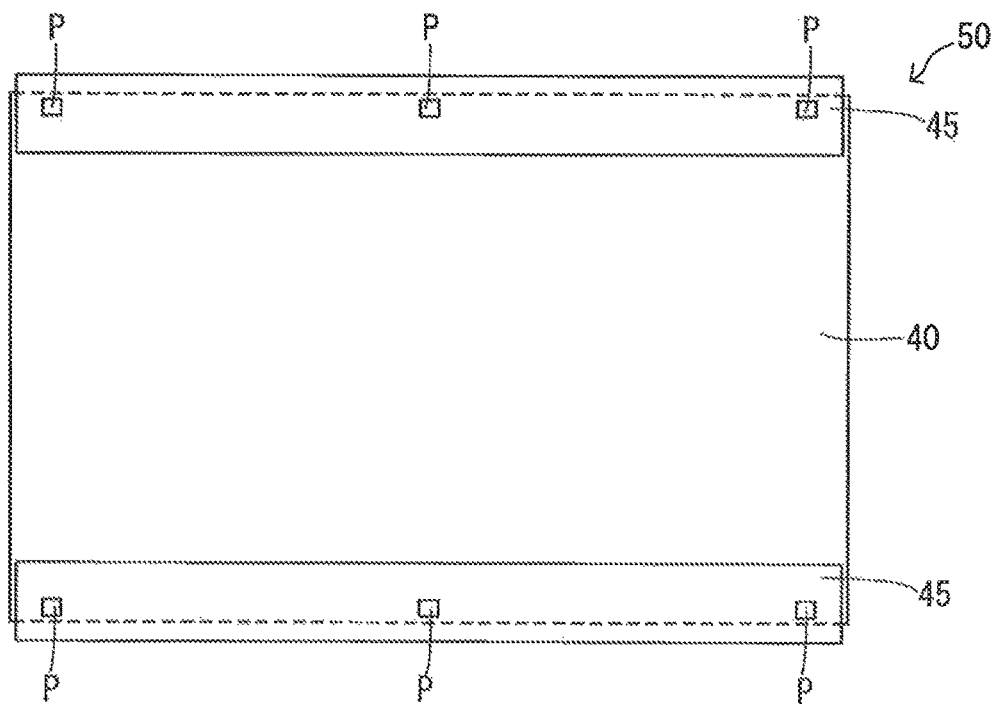
FIG. 14 is a plan view of the flow path member.

FIG. 14 is a plan view of the flow path member 50. The shield plate 45 is welded along a long side of the porous body flow path 40. The welded points in this embodiment are six welds P illustrated in FIG. 14.

Figure 15:
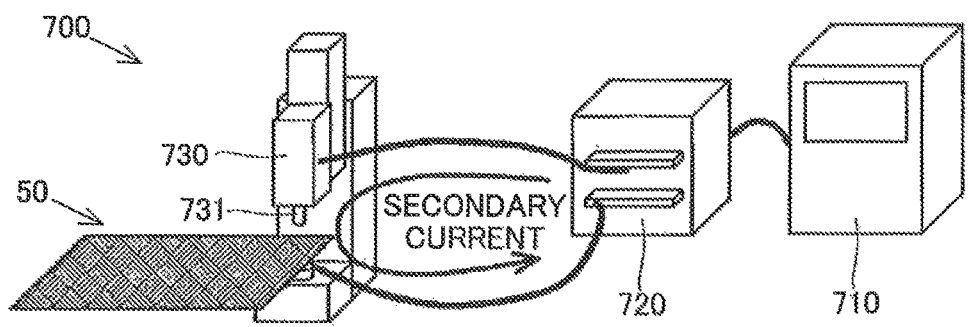
FIG. 15 is a view illustrating a welding system.

FIG. 15 illustrates a welding system 700. The welding system 700 includes a power source 710, a transformer 720, and a welding gun 730.

The power source 710 has a timer function to supply power to the transformer 720 for a predetermined period of time. The transformer 720 supplies a secondary current to the welding gun 730. The secondary current is generated by the transformer 720 converting voltage of the power supplied from the power source 710. The welding gun 730 performs spot welding using the supplied secondary current.

Figure 16:
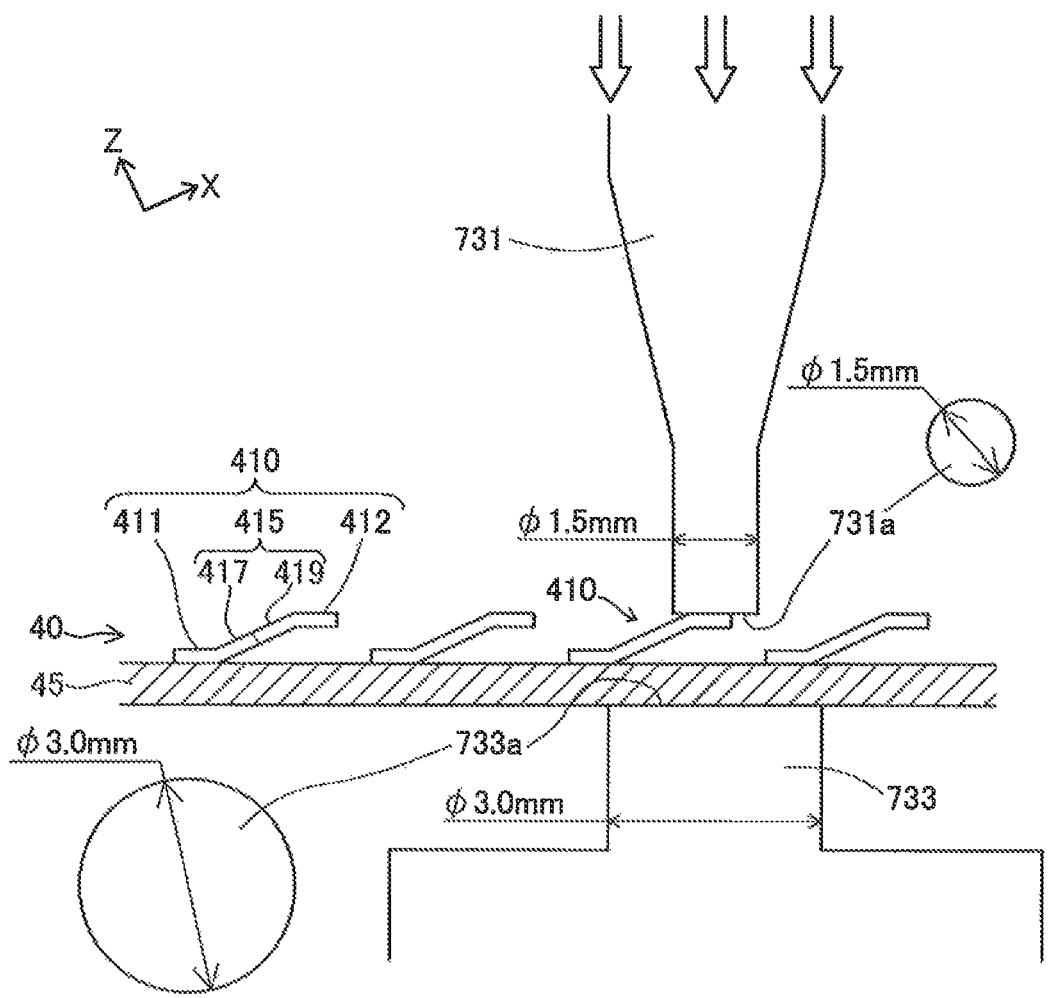
FIG. 16 is a cross-sectional view illustrating a state of welding by a welding gun.

FIG. 16 is a cross-sectional end view illustrating a state of the welding. The porous body flow path 40 is placed on the shield plate 45 so that the first inclined portions 411 contact the shield plate 45.

As illustrated in FIG. 16, the first inclined portion 411 inclines with respect to the flat portion 415 so that all the first inclined portions 411 form one flat plane. Therefore, each first inclined portion 411 contacts the shield plate 45 in a surface contact manner. The inclination of the first inclined portion 411 and the inclination of the second inclined portion 412 are substantially parallel to each other.

The welding gun 730 includes an upper electrode 731 and a lower electrode 733. A portion near the tip of the upper electrode 731 has a circular pillar shape, and an outer diameter thereof is 1.5 mm. Therefore, an area of an end face 731a of the upper electrode 731 is 7.07 mm$^2$. A portion near the tip of the lower electrode 733 has a circular pillar shape, and an outer diameter thereof is 3.0 mm. Therefore, an area of an end face 733a of the lower electrode 733 is 28.27 mm$^2$.

Conditions of the spot welding in this embodiment are as follows. A pressing force of the upper electrode 731 against the lower electrode 733 is 50±3 N, welding current is 920±30 A, welding time is 35±3 milliseconds, and slope time is 1.8 milliseconds.

Upon the spot welding, the upper electrode 731 is pressed toward the lower electrode 733 in a state where the upper electrode 731 contacts the second inclined portion 412. When the upper electrode 731 contacts the second inclined portion 412, the welding current starts flowing, thereby starting the welding between the first inclined portion 411 and the shield plate 45.

Figure 17:
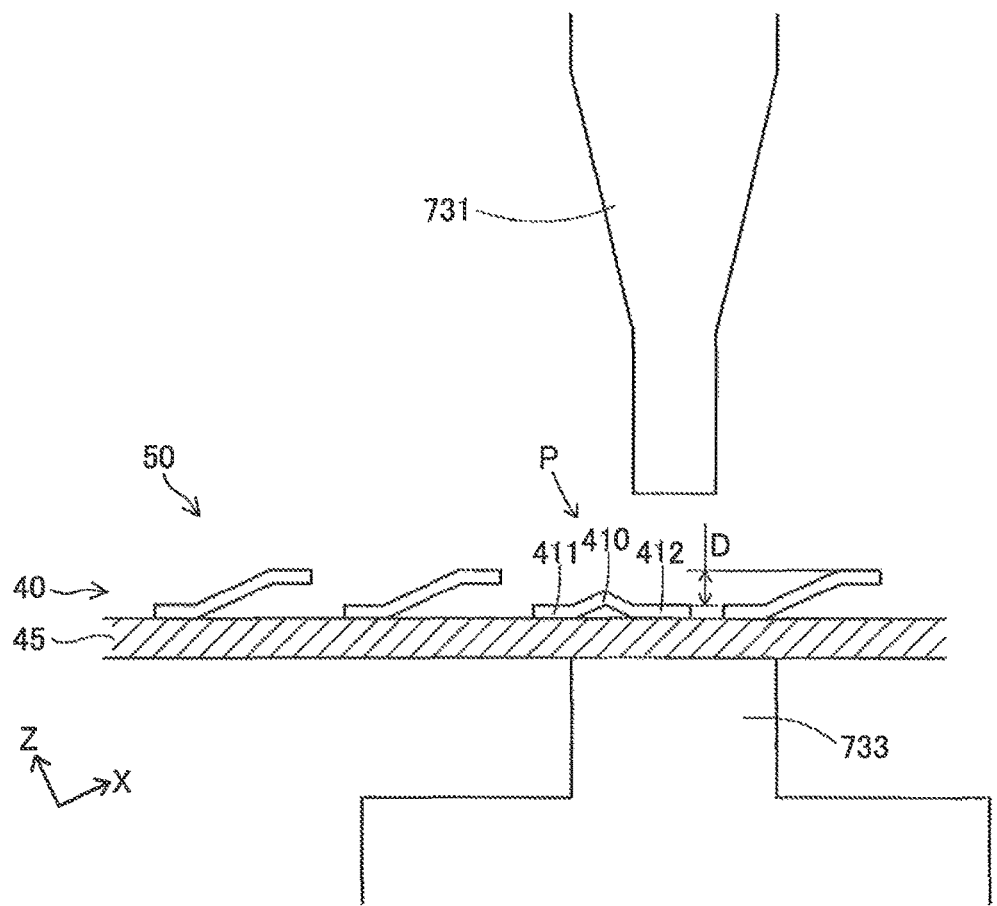
FIG. 17 is a view illustrating a state after spot welding.

FIG. 17 illustrates a state after the spot welding. As illustrated in FIG. 17, the second inclined portion 412 is deformed by the pressing force until it contacts the shield plate 45. As the result, the second inclined portion 412 is also welded to the shield plate 45. On the other hand, the shield plate 45 is seldom deformed even after the welding. One of the reasons is that the outer diameter of the upper electrode 731 is smaller than the outer diameter of the lower electrode 733.

As described above, the deformation of the shield plate 45 due to the spot welding is smaller than the deformation of the porous body flow path 40 due to the spot welding. In more details, the deformation of the shield plate 45 due to the spot welding is smaller than the deformation of the base part 410 due to the spot welding. The magnitude of the deformation in this embodiment is defined by a distance by which the object is deformed inwardly in thickness directions thereof (hereinafter "the pressing deformation amount"). The thickness directions are directions along the thickness of the shield plate 45, and are vertical directions in FIG. 17. The inward is a pushed direction of the object by one of the electrodes contacting the object at the time of welding. That is, the inward for the porous body flow path 40 is a downward direction in the drawings, and the inward for the shield plate 45 is an upward direction in the drawings.

The pressing deformation amount of the base part 410 is represented by a distance D in FIG. 17. Measurements of the pressing deformation amount of the base part 410 may be achieved by comparing the shapes of the base part 410 (which is a target object of the welding) before and after welding, or by comparing the height in the thickness directions of one of the base parts 410 with the heights of other base parts 410 which are not yet welded, as illustrated in FIG. 17.

The pressing deformation amount of the shield plate 45 can be measured by measuring a deformation amount of part of the shield plate 45 which were in contact with the lower electrode 733 (because the deformation is so small, it is not illustrated in the drawing).

Note that the weld at the first inclined portion 411 is better than the weld at the second inclined portion 412, and has a higher tensile strength after the welding. This is because the first inclined portion 411 contacts the shield plate 45 from the beginning of the welding, and this contact is a surface contact (i.e., the welding current is easy to flow between the first inclined portion 411 and the shield plate 45).

Figure 18:
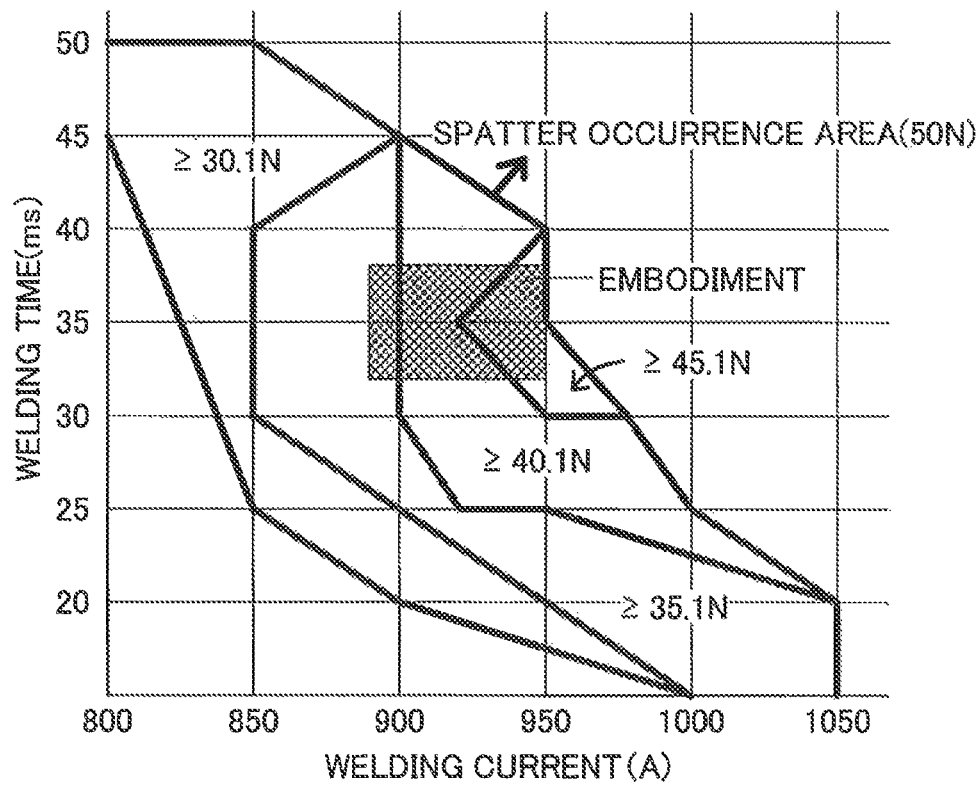
FIG. 18 is a chart illustrating experimental results based on the study of a relation between welding conditions and occurrences of spatter.

FIG. 18 is a chart illustrating experimental results based on the study of a relation between the welding conditions and occurrences of spatter. The vertical axis of the chart indicates the welding time, and the horizontal axis indicates the welding current. Errors of the welding time in the experiment were ±0.1 milliseconds or less. Errors of the welding current in the experiment were ±2%.

As illustrated in FIG. 18, in a case where the pressing face is 50 N, spatter occurs if the welding time is more than 50 milliseconds, or if the welding current is more than 1050 A. As illustrated in FIG. 18, in a case where the pressing force is less than 50 N, spatter does not occur if the welding time is less than 50 milliseconds and the welding current is less than 1050 A, depending on the values of the welding time and the welding current.

In the case where the values in this embodiment described above are adopted, spatter does not occur as illustrated in FIG. 18. Note that the phrase "spatter does not occur" may also include a state where small quantity of spatter occurs. The "small quantity" is an amount which does not cause a problem, for example, on the manufacturing process.

As illustrated in FIG. 18, in a case where the pressing force is within a range of 45.1 N or more and 50 N or less, spatter may also occur under the conditions where spatter does not occur when the pressing force is 50 N. Further, as illustrated in FIG. 18, the conditions where spatter occurs are expanded as the pressing force decreases to ranges, such as 40.1 N or more and 45.1 N or less, 35.1 N or more and 40.1 N or less, and 30.1 N or more and 35.1 N or less.

Figure 19:
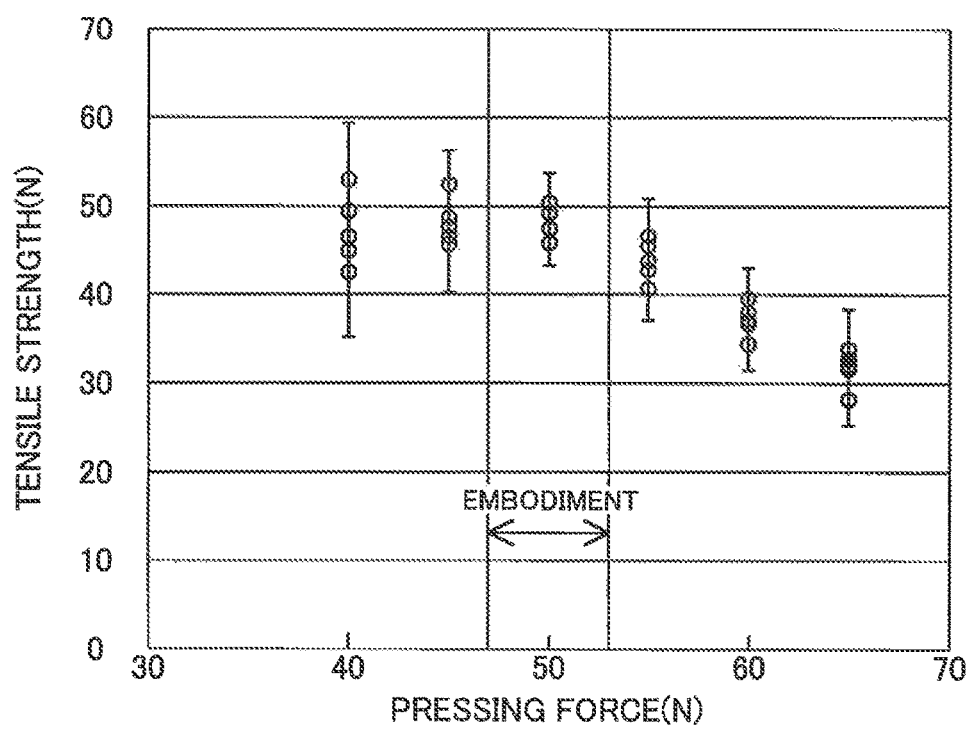
FIG. 19 is a chart illustrating experimental results based on the study of a relation between a tensile strength of a weld and a pressing force.

FIG. 19 is a chart illustrating experimental results based on the study of a relation between the tensile strength of a weld and the pressing force. The welding current was set to 920 A and the welding time to 35 milliseconds for all the experiment samples.

In this experiment, the pressing force was varied from 40.1 N to 65.1 N by 5 N. This is because in a case where the welding current is 920 A and the welding time is 35 milliseconds, spatter occurs if the pressing force is less than 40.1 N as described using FIG. 18.

Five samples were prepared for those pressing forces, and the tensile strengths at a weld P were measured for each sample. Error bars illustrated in this chart indicate a range of "[average]±3×[standard deviation]" for each pressing force. When the pressing force was 45.1 N, 50.1 N, and 55.1 N, each value of "[average]−3×[standard deviation]" is more than 37 N and, thus, sufficient strength is secured. As described, in this embodiment, the pressing force is set to 50±3 N. Therefore, the sufficient strength can be secured according to this embodiment.

Figure 20:
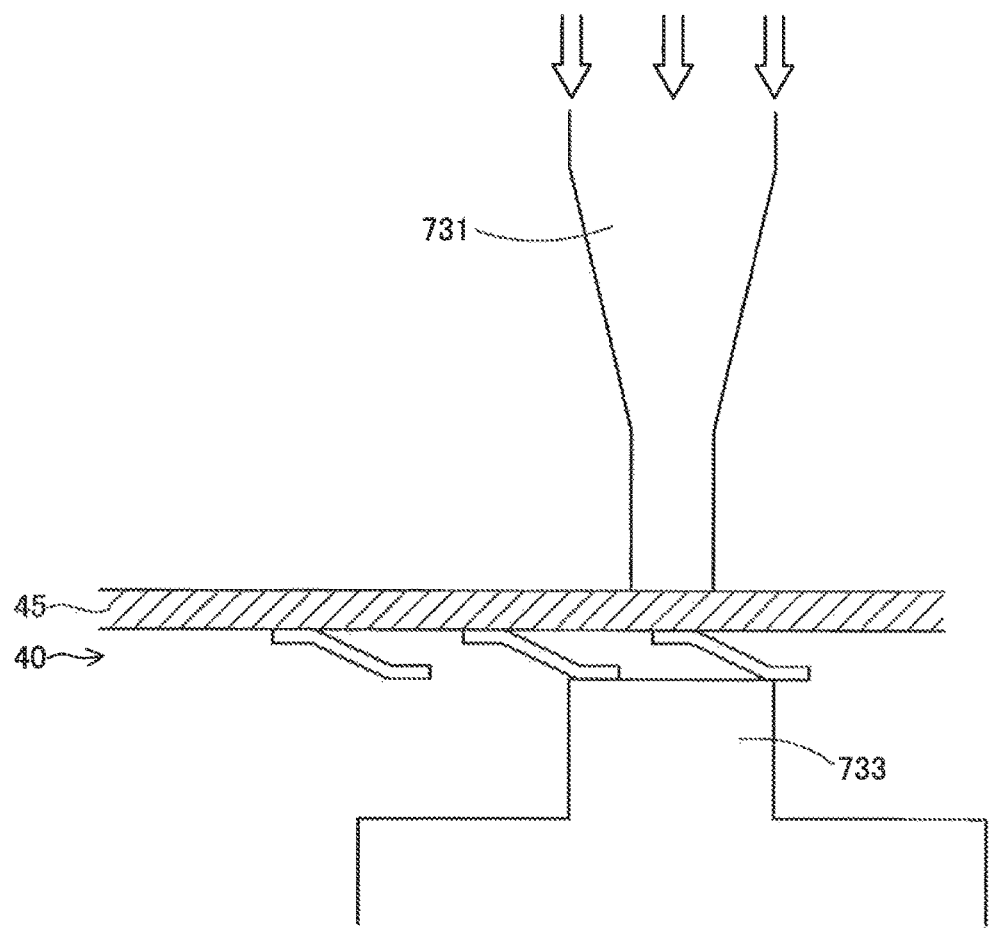
FIGS. 20 and 21 are views illustrating a state of welding in a comparative example.
Figure 21:
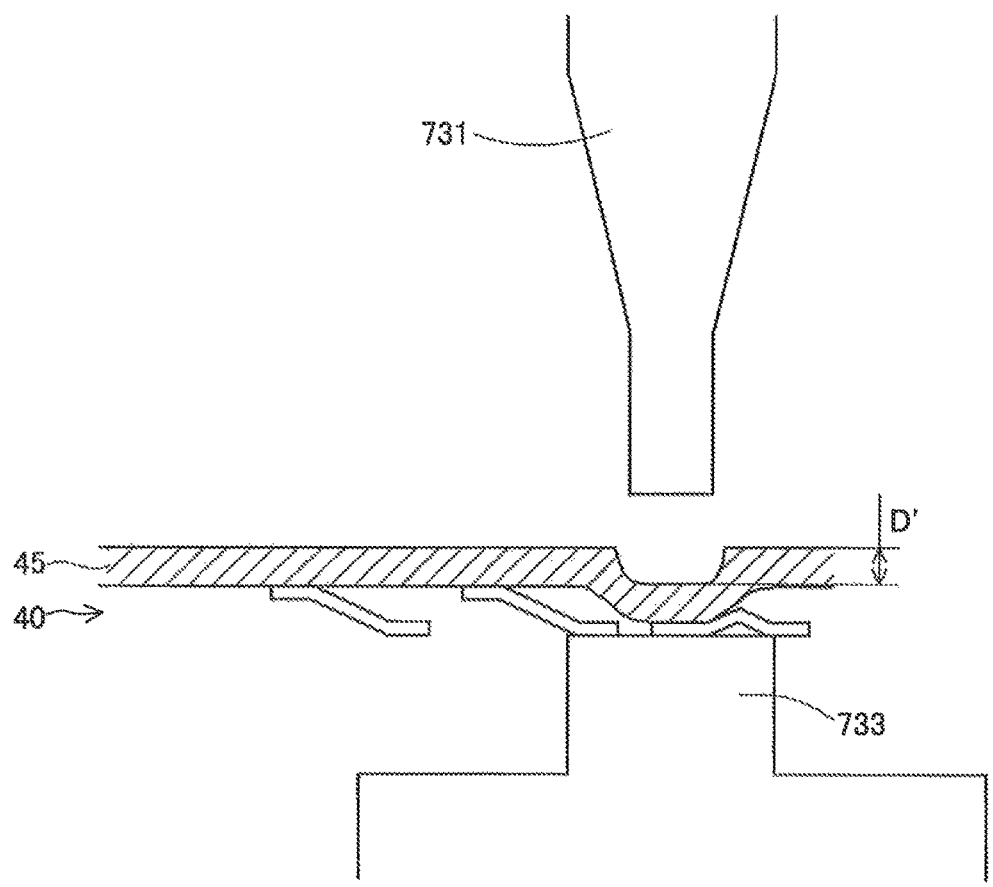

FIGS. 20 and 21 illustrate states of welding in a comparative example. As illustrated in FIG. 20, in this comparative example, the upper electrode 731 contacts the shield plate 45, and the lower electrode 733 contacts the porous body flow path 40. When welding in this way, the porous body flow path 40 is pressed by the upper electrode 731 via the shield plate 45. As the result, the porous body flow path 40 significantly deforms outwardly in the thickness directions (downward in this drawing) as illustrated in FIG. 21. Meanwhile, the porous body flow path 40 hardly deforms inwardly in the thickness directions since the area of the lower electrode end face 733a contacting the porous body flow path 40 is large. Therefore, the pressing deformation amount of the porous body flow path 40 is substantially zero.

On the other hand, the shield plate 45 is pressed by the upper electrode 731 and significantly deforms inwardly in the thickness directions since the area of the upper electrode end face 731a contacting the shield plate 45 is small. As the result, the pressing deformation amount of the shield plate 45 becomes larger than the pressing deformation amount of the porous body flow path 40. The pressing deformation amount of the shield plate 45 is illustrated by D' in FIG. 21.

Thus, when the shield plate 45 deforms by pressing, wrinkles (not illustrated) are generated in the shield plate 45. The wrinkles of the shield plate 45 cause a variation in the thickness of the flow path member 50, resulting in a variation in surface contacting pressure at the time of stacking the flow path members 50. As a result, this may be a reason for reducing the power generation performance.

According to the embodiment described above, at least the following effects can be obtained. In the case of the embodiment described above, precision of the thickness of the flow path member 50 is suitable by reducing the deformation of the shield plate 45 due to welding, compared with the comparative example described above. As the result, the surface contacting pressure at the time of stacking is stabilized, thereby stabilizing the power generation performance. Note that, even if one certain base part 410 is deformed by welding, the influence of the deformation is absorbed by the deformation of the connecting part 450, and other base parts 410 are hardly deformed. Therefore, the deformation of the base part 410 seldom worsens the precision of the thickness of the flow path member 50.

Since the deformation of the shield plate 45 is reduced, the precision of the thickness of the flow path member 50 becomes suitable even if the thickness of the shield plate 45 is reduced. For example, supposing that the thickness which is adopted in order to reduce the deformation of the shield plate 45 is 0.1 mm in the case of the comparative example described above, the precision of the thickness will not get worse even if the thickness is 0.05 mm in this embodiment. As a result, reductions in the size and weight of the fuel cell can be achieved.

Since the first inclined portion 411 surface-contacts the shield plate 45 at a stage before welding, the contacting area between the porous body flow path 40 and the shield plate 45 increases compared with cases of line contact and point contact. As a result, the welding current is stabilized, thereby stabilizing welding.

Since the upper electrode 731 surface-contacts the second inclined portion 412, the end face of the upper electrode 731 is difficult to receive damages. As a result, the life of the upper electrode 731 increases.

Because of the structure of the porous body flow path 40, the flow path will not be blocked even if the porous body flow path 40 is welded. Therefore, a gas flow is hardly influenced.

The present invention is not limited to the embodiment, examples, and modifications of this specification, and can be achieved in various structures without departing from the scope of the invention. For example, technical features in the embodiment, examples, and modifications corresponding to technical features of each aspect cited in the section of "SUMMARY OF THE INVENTION," can suitably be substituted and/or combined in order to achieve some or all of the purposes described above, or in order to obtain some or all of the effects described above. The technical features can suitably be deleted if they are not described as essential matters in this specification. For example, the following may be illustrated.

Any kind of welding techniques may be employed as long as the pressing deformation amount of the shield plate can be smaller than the pressing deformation amount of the porous body flow path. For example, the area of the upper electrode end face may be the same as the area of the lower electrode end face, the material of the porous body flow path may be softer than the material of the shield plate, or the porous body flow path may be made in a shape to have a lower rigidity. Alternatively, these techniques may suitably be combined.

The porous body flow path may not be provided with the first inclined portion, or may not be provided with the second inclined portion. The porous body flow path may line-contact or point-contact the shield plate in a state before spot welding.

Any kind of manufacturing method of the porous body flow path may be applied. For example, the formation of the first inclined portion and/or the second inclined portion may be carried out as a separated process from the press forming (process P530) of cutting and the formation of the valley portion. Alternatively, the process for one sheet of the porous body flow path may be achieved by a single pressing process. Alternatively, the porous body flow path may be manufactured by processing, such as cutting, casting, etc., other than the pressing process.

The object to be welded to the porous body flow path is not limited to the shield plate, but may be other plate materials depending on the structure of the fuel cell and/or changes in the manufacturing method.

What is claimed is:

1. A method of welding, comprising:
   contacting a first electrode to a first portion of a porous body flow path, the porous body flow path having a second portion that is connected to a plate material via a weld;
   contacting a second electrode to the plate material;
   pressing the first portion of the porous body flow path and the plate material by the first and second electrodes in a thickness direction of the plate material; and
   spot welding the first portion of the porous body flow path and the plate material, wherein the pressing forms a deformation of the plate material in a direction of the second electrode pressing the plate material that is smaller than a deformation of the first portion of the porous body flow path in a direction of the first electrode pressing the first portion of the porous body flow path.

2. The method of welding in accordance with claim 1, wherein an area of an end face of the first electrode is smaller than an area of an end face of the second electrode.

3. The method of welding in accordance with claim 1, wherein the spot welding is initiated after the first electrode surface-contacts the porous body flow path.

4. The method of welding in accordance with claim 1, wherein the plate material is a shield plate that shields a seal material when the plate material is assembled as a fuel cell.

5. The method of welding in accordance with claim 1, wherein the porous body flow path is separated at a flat portion and at the first portion from the plate material in a state before the spot welding is performed.

6. The method of welding in accordance with claim 5, wherein the porous body flow path is joined to the plate material at the first portion and the second portion in a state after the spot welding is performed.

* * * * *